(12) United States Patent
Fujita et al.

(10) Patent No.: US 8,316,103 B2
(45) Date of Patent: Nov. 20, 2012

(54) METHOD FOR ACQUIRING LONG DATA BY GET METHOD

(75) Inventors: Takeshi Fujita, Chiba ken (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 12/300,710

(22) PCT Filed: May 15, 2007

(86) PCT No.: PCT/JP2007/059964
§ 371 (c)(1),
(2), (4) Date: Nov. 13, 2008

(87) PCT Pub. No.: WO2007/132849
PCT Pub. Date: Nov. 22, 2007

(65) Prior Publication Data
US 2009/0210515 A1 Aug. 20, 2009

(30) Foreign Application Priority Data

May 15, 2006 (JP) ................. 2006-135898
Sep. 27, 2006 (JP) ................. 2006-263005
Mar. 27, 2007 (JP) ................. 2007-082876
Mar. 27, 2007 (JP) ................. 2007-082877

(51) Int. Cl.
*G06F 15/16* (2006.01)
(52) U.S. Cl. ...................... 709/218; 709/223
(58) Field of Classification Search .............. 709/218, 709/223
See application file for complete search history.

(56) References Cited

U.S. PATENT DOCUMENTS 5,760,823 A * 6/1998 Brunson et al. ............ 348/14.06
6,574,795 B1 * 6/2003 Carr ........................... 725/71
(Continued)

FOREIGN PATENT DOCUMENTS
JP 2002-358257 12/2002

OTHER PUBLICATIONS

Japanese Office Action dated Apr. 5, 2011 for corresponding Japanese Application No. 2008-515565.
(Continued)

*Primary Examiner* — David Lazaro
*Assistant Examiner* — Waseem Ashraf
(74) *Attorney, Agent, or Firm* — K&L Gates LLP

(57) ABSTRACT

[PROBLEMS] To pass long data which cannot be passed conventionally by the GET method, by using the GET method.
[MEANS FOR SOLVING PROBLEMS] [1] Long data which cannot be passed by the GET method is read from storage means, divided into a plurality of data pieces of the length which can be passed by the GET method, and stored in storage means. [2] A number of program execution regions corresponding to the number of the divided data pieces are generated. [3] The data pieces stored in the storage means are distributed to the generated program execution regions by the GET method. [4] In the respective program execution regions which have received the data pieces by the GET method, transfer programs are executed and the respective transfer programs search regions for executing a program performing coupling. [5] The data pieces are passed to the regions for executing the program performing coupling of the data searched from the respective transfer programs. [6] In the program execution regions which have received the data pieces, the coupling program is executed so that the coupling program couples the respective data pieces to reproduce data of the length which cannot be passed by the GET method and stores it in the storage means.

7 Claims, 9 Drawing Sheets

U.S. PATENT DOCUMENTS

| | | | |
|---|---|---|---|
| 6,658,462 B1* | 12/2003 | Dutta | 709/219 |
| 2002/0052946 A1* | 5/2002 | Yoshino | 709/223 |
| 2002/0141405 A1* | 10/2002 | Bouet | 370/389 |
| 2003/0002637 A1* | 1/2003 | Miyauchi et al. | 379/93.01 |
| 2003/0046366 A1* | 3/2003 | Pardikar et al. | 709/219 |
| 2003/0163556 A1* | 8/2003 | Haneda | 709/223 |
| 2004/0243934 A1* | 12/2004 | Wood et al. | 715/517 |
| 2006/0020598 A1* | 1/2006 | Shoolman et al. | 707/8 |
| 2006/0031748 A1* | 2/2006 | Brady et al. | 715/500 |
| 2006/0075084 A1* | 4/2006 | Lyon | 709/223 |
| 2006/0123010 A1* | 6/2006 | Landry et al. | 707/10 |
| 2006/0212539 A1* | 9/2006 | Palevich et al. | 709/217 |
| 2006/0230164 A1* | 10/2006 | Schlimmer et al. | 709/230 |
| 2006/0242664 A1* | 10/2006 | Kikkawa et al. | 725/37 |
| 2007/0208824 A1* | 9/2007 | Ullman et al. | 709/217 |
| 2007/0260678 A1* | 11/2007 | Fukui et al. | 709/203 |
| 2009/0328061 A1* | 12/2009 | Fujita et al. | 719/313 |

OTHER PUBLICATIONS

Kuniyasu Nakagawa, Making cheap and comfortable Web chat, Network computing, Japan Rick telecom Co., Ltd., Nov. 1, 1998, vol. 10 No. 11, p. 7-16.

* cited by examiner

METHOD FOR ACQUIRING LONG DATA BY GET METHOD

CROSS-REFERENCE TO RELATED APPLICATIONS

This application is the National Stage of International Application No. PCT/JP2007/059964 filed May 15, 2007, which claims the benefit of Japanese Patent Application No. 2006-135898 filed May 15, 2006, Japanese Patent Application No. 2006-263005 filed Sep. 27, 2006, Japanese Patent Application No. 2007-082876 filed Mar. 27, 2007, and Japanese Patent Application No. 2007-082877 filed Mar. 27, 2007, the disclosures of which are incorporated herein by reference in their entireties.

TECHNICAL FIELD

The invention relates to technology for acquiring long data by the HTTP GET method.

BACKGROUND OF THE INVENTION

The length of character strings passed by the HTTP (HyperText Transfer Protocol) GET method has been restricted.
An applicant does not know the existence of the state of the art relating to solving the restriction.

DISCLOSURE OF THE INVENTION

Subject of Matter of the Invention

The invention enables the HTTP GET method to transfer the longer data beyond the conventional restricted HTTP GET method.

Solution Exploited by the Invention

The invention provides a computer to perform the following steps:
Step 1) reads the long data beyond the GET method restriction from storage unit, divides it into plural segments which the GET method can accept to pass, and stores them in the storage unit.
Step 2) generates the same number of executable program regions as the number of the divided segments.
Step 3) distributes the segments stored in the storage unit to the generated executable program regions by the GET method.
Step 4) run the transfer programs in each executable program regions which has received the segments by the GET method, and each transfer program searches an executable region for concatenating all segments.
Step 5) passes each segment from each transfer program to the searched executable regions for performing concatenation.
Step 6) invokes concatenation in the executable program regions which have received the segments to reconstruct all or a part of the original data which cannot be passed by the GET method, then stores it in the storage unit.

EFFECT OF THE INVENTION

With this method, the long data is divided into segments of the length which can be passed by the GET method, and segments, after being passed by the GET method, are concatenated to construct a part or all of the original data, it is feasible that the longer data than beyond the conventional GET method restriction can be passed by the GET method.

THE BEST EMBODIMENT APPLICATIONS OF THE INVENTION

Embodiment 1

The embodiment of the first invention of this application will be described with reference to the drawings.
[Description of Configuration]
In FIG. 1, a Domain (1) HTTP server is running on a server computer. In the figure, two HTTP servers of the domain (1) are illustrated, which designate the identical HTTP server. Similarly, a Domain (2) HTTP server is running on a different sever computer. Data to be handled by each HTTP server is IOed to the storage unit, such as a HDD (Hard Disk Drive) provided to the server computer.

A HTTP client which accesses these HTTP servers is running on a client computer. Two kinds of HTTP clients will be described hereafter, one is communicating with the Domain (1) HTTP server and the other is communicating with the Domain (2) HTTP server, which will be described in detail in the DESCRIPTION OF ACTION section. Data to be handled by the HTTP client is all IOed to the storage unit, such as the HDD provided to the client computer. In the embodiment, the Microsoft Internet Explorer is assumed under a Microsoft Windows (registered trademark) OS environment as the HTTP client browser.
[Description of Action]
The entire actions will be designated by the arrows A-F in the figures. The following described Actions are performed by various computer programs.
[Action A]
A user of the client computer operates an input device to request the HTTP client to read a content program. The HTTP client having received the instruction requests the Domain (1) HTTP server to provide the content program.

The Domain (1) HTTP server reads the requested content program from the storage unit and provides it to the requesting HTTP client.

In the embodiment, the content program is assumed to be written in HTML, which provides the users of the client computer various information. The HTML contains the logic of Javascript (registered trademark), the logic of which is referred to as the data-request-program (the first program) hereinafter.

The Domain (1) HTTP client invokes the received content program (main program) which contains the data-request-program.

The content program provides the user of the client computer the prescribed information via the output unit, such as a display device. The content program invokes the data-request-program at the sequence stage. Here, the data-request-program is assumed to implement a prescribed callback function. The data-request-program can start by the user's instruction from an input device, for example.
[Action B, Action C]
The data-request-program runs for the Domain (1) content program accessing the data provided from the Domain (2) HTTP server. At first, the data-request-program invokes the HTTP client to communicate with the Domain (2) HTTP server and acquire both a data-acquiring-program and a data-distribution-program from the Domain (2) HTTP server. The data-acquiring-program and the data-distribution-program are contained in HTML as the logic of Javascript (registered trademark). The request to the Domain (2) HTTP server is issued as a HTTP GET method in the embodiment. The data-request-program, instructing the GET method to the DOMAIN (2) HTTP, produces an identifier ID of the data-request-program to enable the data-distribution-program to get the ID of the data-request-program. Because a Javascript (registered trademark) program can acquire the information of an URI (Uniform Resource Identifier) of HTML being displayed in the browser region by referring to the property of LOCATION object, by passing the identifier ID of the data-request-program to the Domain (2) HTTP client at instructing the GET method, the data-distribution-program running on the Domain (2) HTTP client can acquire the identifier ID of the data-request-program. (hereinafter, unless otherwise specified, the same mechanism is applied when data is exchanged as the GET method between the HTML browser regions.) The identifier ID can be, for example, the function identifier of the data-request-program, or the function identifier of the callback function or the like. The data-request-program having completed the described procedures becomes into the wait sate for the callback function. Then the content program can continue other procedures.

The Domain (2) HTTP server receives the request from the Domain (2) HTTP client, prepares both the data-acquiring-program and the data-distribution-program, and provides the Domain (2) HTTP client with them. The data-distribution-program is given the ID of the data-request-program.

The data-acquiring-program and the HTTP client provided with it, firstly, invoke the data-acquiring-program (the second program). The data-acquiring-program performs the action of acquiring data which the Domain (2) content program needs from the Domain (2) HTTP server. The data-acquiring-program is triggered by the event of the input device to acquire the prescribed information by requesting to the Domain (2) HTTP. The Domain (2) HTTP server having received the request prepares the required data, and provides the data-acquiring-program it. The data-acquiring-program stores the data acquired from the Domain (2) HTTP server in the storage unit.

[Action D and E]

The Domain (2) HTTP executes invokes data-distribution-program (the second program). The data-distribution-program investigates whether a length of data stored in the storage unit by the data-acquiring-program is acceptable to the GET method, if the length exceeds the acceptable one by the GET method, the data-distribution-program divides the data into the acceptable length segments, and appends a serial number p to divided each segment v. Additionally, the first segment is attached with the number of the divided segments divided num. The data-distribution-program stores an association between these segments and the attached information in the storage unit.

Subsequently, the data-distribution-program invokes the HTTP client which communicates with the Domain (1) HTTP server, and generates the same number of executable program regions as the number of the divided segments under the control of the HTTP client. In the embodiment, assuming the number of the divided segment is three, the executable program regions (1)-(3) are shown. The executable program region is assumed to be a frame generated by IFRAME tag in the embodiment. The data-distribution-program reads each segments from the storage unit, and distributes each segment to one of executable program regions (1)-3). At this time, the GET method is used.

The data-distribution-program gives a GET statement to each of the executable program regions (1)-(3). Each GET statement is appended with the segment divided as argument. Moreover, each GET sentence is appended with the attached information associated with each segment and the ID of the data-request-program as arguments.

Concretely, the arguments appended to the GET statement running in the executable program region (1) include: the ID of the data-request-program; the number of divided segments num=3; the sequential segment number p=0; and the first segment v=segment (1). The arguments appended to the GET statement running in the executable program region (2) include: the ID of the data-request-program; the sequential segment number p=1; and the second segment V=segment (2). The arguments appended to the GET statement running in the executable program region (3) include: the ID of the data-request-program; the sequential segment number p=2; and the third (last) segment V=segment (3).

An address which each GET statement requests is an address of a transfer program which the Domain (1) HTTP server provides.

Assigning each GET statement to each executable program regions (1)-(3), results in that the segments acquired from the Domain (2) HTTP server is passed to the Domain (1) HTTP client.

The Domain (1) HTTP server having received a GET request from each of the executable program regions (1) to (3) reads the requested transfer program from the storage unit and provides it to each of the executable program regions (1)-(3).

Meanwhile, if the length of the data is enough for the GET method to accept without dividing the data, the only one executable program region is generated. In this case, the number of divided segment number is num=1.

[Action F]

Each executable program regions (1)-(3) runs its own transfer program (the third program) provided from the Domain (1) HTTP server. The transfer program is written in HTML containing the logic of Javascript (registered trademark).

Each of the transfer programs (1)-(3) first tries to recognize the HTTP client where the data-request-program is running. The self.parent.parent property of the window object is available in the embodiment.

Each of the transfer programs (1)-(3) associates the following: ID of the data-request-program passed from the data-distribution-program by the GET statement; the divided segment number num; the sequential segment number p; and the segment v, then passes it to the HTTP client running the data-request-program. Its passing to the identical HTTP client is done by each of the transfer programs (1)-(3) individually. The HTTP client receiving the information searches the data-request-program in waiting state according its ID, and passes to the searched one an association of the number of the divided segments num; the sequential segment number p; the segment from each transfer program (in the embodiment, the value of num is passed from only the transfer program (1)).

The passing data from each transfer program to the data-request-program runs in parallel with each transfer program calling the data-request-program. For example, the callback function of the data-request-program in the content program is assumed to be named "cbfunc." The function is implemented in a parent of a parent of the transfer program. In the logic of the transfer program, calling the function self.parent.parent.cbfunc (arg1, arg2, . . . ) passes the arguments arg1, arg2, . . . to the data-request-program.

Since the value is to be passed from the Domain (1) HTTP client to the same Domain (1) HTTP client, the value can be passed under the security restriction of the HTTP client.

The data-request-program resumes from the waiting sate by receiving the value. First, it decides the number of received segments corresponds to the number of divided segments, num, if all the divided segments are received, the individual segments v are lined up in order of the sequential segment number p to be concatenated all together, thereby, the entire data provided from the Domain (2) HTTP server is reconstructed.

The data-request-program passes the reconstructed data to the content program, which enables the content program to change a service to the user based on the provided data from the Domain (2) HTTP server.

[Application 1]

For example, it is applicable that by adding authentication to the Domain (2) HTTP server the Domain (1) content can use the result of its authentication to distinguish the service provided to the user.

[Effect of Application 1]

A content creator who just prepares a description of a scripting language needed for a creator side can use more services of different domains, such as an authentication service. Thus, the creator can easily construct an excellent secure E-Commerce site, and is able to use data of foreign domains without newly implementing a server side mechanism. Additionally, since the long data beyond the GET method restriction can be divided into acceptable segments, which are concatenated to reconstruct the original data on a HTTP client running the content program by use of the GET method, therefore the any length data can be passed by the GET method beyond its restriction.

[Variation 1]

Application of INVENTION is not limited to the above embodiment. For example, the executable program region, which the data-distribution-program opens in the Domain (1), is not limited to the frame generated by IFRAME tag, but also a window object can be respectively opened for each of the executable program regions. In the embodiment, the number of divided segment num is associated with only the first segment. However, it is applicable that the number of divided segment number may be associated with all segments, and conversely, that one more executable program region can be generated to which only the number of the divided segment number num is passed without num being associated with any segments.

Furthermore, the POST method rather than the GET method can be exploited for passing data from the data-distribution-program to the Domain (1) executable program region. In this case, a CGI corresponding to the POST is prepared in the Domain (1) HTTP server in advance, the data-distribution-program passes data by the POST method to the Domain (1) HTTP server and provides the executable program region with a program embedded on the CGI side. Additionally, the HTTP client invoked by the data-request-program can run in non-display mode, or can run with display mode depended on requirement. The HTTP client invoked by the data-request-program and the HTTP client invoked by the data-distribution-program can be issued with a new window or a frame.

[Variation 2: Data Division]

In the described embodiment of "method for acquiring different Domain information," the description of ACTION D-F explains how the data-dividing-program divides the requested data into segments acceptable to the GET method; the data-request-program concatenates the segments. Variation of dividing the long data is described.

It is assumed that the targeted information is as follows:
name=OgaWa&date=20060531&Domain=kawachi.com&path=index.html&permission=all&perfect The data-dividing-program divides the above targeted information according to a prescribed rule into plural fragments. Each fragment is an element consisting of the targeted information. Various methods of dividing the targeted information are available as well as the above embodiment: the information is divided by a constant number of characters; the information is divided into even order of characters and odd order of characters; the information is divided at the place of "&" which connects parameters into individual arguments, such as NAME, DATA, DOMAIN and the like. In these cases, it is also applicable that instead of waiting for receiving the entire information, just receiving the information fragments of NAME and DOMAIN, which is reconstructed to consist of NAME and DOMAIN with ignoring other arguments, which can be determined in advance on the side of the data-request-program. Furthermore, the information fragments can be overlapped such that one is name=Ogawa&date=20060531, and the other information fragment is date=20060531&Domain=kawachi.com. So long as a length of one information fragment is within the GET method restriction, the more division rule can be applicable.

The data-dividing-program can determine an information fragment identifier corresponding to every information fragment. "Sequential number" in the above embodiment corresponds to the information fragment identifier. The information fragment identifier can be an alignment sequence of the divided information fragments with sequential numbers such as 1, 2, 3, etc. In a case of dividing the parameter into argument based fragments as in the above, the argument names of each parameter, such as NAME and DATA, can be used as the information fragment identifier.

The data-dividing-program can assign to each information fragment an identifier of the targeted information. This is for the purpose that the information fragment needed to reconstruct the entire targeted information can be selected based on the targeted information identifier on the side of the data-request-program. The targeted information identifier can be given as an identical identifier to every information fragment, or as a different identifier to the information fragments. In the case of giving a different identifier to each information fragment, associating the different identifiers with the common targeted information is registered on the data-request-program, and the data-request-program refers to the method for associating with the targeted information and selects information fragment whose targeted information is common.

Embodiment 2

EMBODIMENT 2 according to the second invention will be described.

[Description of Configuration]

FIG. 2 is the configuration diagram of the computer system in the embodiment. The computer system of the embodiment consists of elements of a general personal computer: input unit1 such as a keyboard and a pointing device; storage unit2 such as RAM (Random Access Memory), ROM (Read Only Memory), an HDD (Hard Disk Drive) and a removable media; display unit3 such as a display monitor; processing unit4 such as a CPU (Central Processing Unit; and communicating unit5 such as NIC (Network Interface Card).

FIG. 3 is the configuration diagram of the software ruing on processing unit4. In the embodiment, a HTTP client 12 runs on an OS (Operating System) 11, the HTTP client 12 provides plural browser regions in either display or non-display mode. The browser region is a window object or a frame object managed by the HTTP client 12. Hereinafter, the window object and frame object are collectively called window objects. The OS 11 I/O to the hardware 10 shown in FIG. 1 via the hardware driver 14.

[Operation Description]

FIG. 4 is the relationship diagram of plural browser regions constructed on the HTTP client 12. Each layer block stacked shows a different browser region. The relation of the stacked browser regions is expressed as the lower one is a parent (the upper level), and the upper one is a child (the lower level). In the embodiment, a program running in each browser region is assumed to be written in Javascript (registered trademark). The following actions are realized by the processing unit4 executing the programs.

Information-acquiring-browser-region of Domain B acquires information from the Domain B HTTP server, and stores the information in the storage unit2.

The program running in the information-acquiring-browser-region of the Domain B opens the information-transfer-browser-region of a Domain A, passes the information to the information-transfer-browser-region, which is acquired from the server of the Domain B, and stored in the storage unit2.

Several approaches are available on to pass the information to a newly opened browser region. One is using the GET method. By using GET method to open a new window object using, a parameter of a URI attached with the information acquired from the Domain B is passed to it. The newly opened browser region, that is, the information-transfer-browser-region, contains a the logic of Javascript (registered trademark) and the program run in the information-transfer-browser-region can receive the information acquired from the Domain B by referring the property of LOCATION object.

The information-transfer-program run in the information-transfer-browser-region refers the parent-child relationship of the individual browser regions stored in the storage unit2, and selects the browser region which is traceable as a parent or a parent of a parent from the pointed information-transfer-browser-region. The selected browser region is referred to as "selected browser region" hereafter.

In the example of FIG. 4, the information-acquiring-browser-region of Domain B and a browser region of Domain C are traceable according to the parent relation from the information-transfer-browser-region to be targets of selection. The browser region in the upper level than the information-acquiring-browser-region is selected. As for tracing the parent, either referring to OPENER property of window object, or referring to PARENT property of the frame object is available.

In addition, the information-transfer-program refers the parent-child relationship stored in the storage unit2 to select an information-use-browser-region of the Domain A among both traceable browser region from the selected browser or the selected browser itself. In other words, the information-transfer-program refers the parent-child relationship stored in the storage unit2, and selects an information-use-browser-region of the Domain A by tracing from the selected region.

In the embodiment, the parent-child relationship stored in the storage unit2 is a parent-child relationship in a tree structure defined in information theory. The plural browser regions in the parent-child relationship are nodes of the tree structure such as the root, branches, nodes and leaves.

In the embodiment, the action for the information-transfer-program to select one of the information-use-browser-region is performed as follows:

In the information-use-browser region, the information-use-program run processing the information acquired from the Domain B server. The information-use-program and the functions called from it contain the logic of Javascript (registered trademark). A function processing the information acquired from the Domain B server is implemented and is assigned an identifier like "funcname".

The information-transfer-program has knowledge in advance that the identifier of the function passed the information acquired from the Domain B server is "funcname" before tracing the information-use-browser region. The identifier of the information passed function is delivered from the information-acquiring-browser-region to the information-transfer-program as an argument of the GET method, and the information-transfer-program can get the identifier from the arguments of the GET method.

The information-transfer-program can get to know which frame object, as a child of "window," implements the identifier "funcname" function by checking a value of window.frames[n-1].funcname: The "window" represents the selected browser region; The frames[n-1] represents the nth frame object as a child of the selected browser region. The n's maximum value can be obtained from the value of windows.frames.length.

The information-transfer-program, discovering the identifier "funcname" function (transfer destination identifier) the Domain A browser regions, selects it as the information-use-browser region.

The information-transfer-program, in case of failing to discover the identifier "funcname" function, repeats the procedure of discovering the "funcname" function in the further child frame of the investigated child frame. The information-transfer-program can investigate the existence of "funcname" function exists in two lower child frame by checking the value of window.frames[n-1]frames[m-1].funcname: frames[m-1] represents the mth frame object as a child of frames[n-1]. A child of three or more degree lower can be investigated by the deeper FRAME property.

In the case of failing to discover the function "funcname" by tracing a child of a child from the selected browser region, the information-transfer-program makes a parent browser region of the current selected browser region as the new selected browser region. As described above, the browser region of the parent can be refereed by the PARENT property. Then the information-transfer-program can recognized whether the new select browser region implements the identifier "funcname" function. In the case that the new selected browser region does not implementing the function, the above process of discovering the "funcname" function is repeated. The value of WINDOW can be replaced with the value of window.parent, or the description of window can be replaced with window.parent. On repeating the above process of discovering the "funcname" function, the checked frame can be omitted from the process for discovering the "funcname" function.

By repeating the procedure, all the tree structure based on the information-transfer-browser region is investigated for discovering the 'funcname' function among traceable browser region. This method can be employed in embodiment 1 as the similar procedure for the transfer program to search the data-request-program.

In the example of FIG. 4, the information-transfer-browser-region recognized the identification of the information-use-browser region is window.parent.parenthames[0] from the point of view of the information-transfer-browser-region "window". Similarly, in FIG. 5, the identification of the information-use-browser region is window.parent.parent.parenthames[0]. (it is assumed the index of the frame displaying the information-use-browser-region is 0.)

The information-transfer-program passes the information acquired from the Domain B server to the "funcname" information-use-function implemented in the information-use-browser region by the obtained identification of the information-use-browser region. The "funcname" information-use-function performs the prescribed procedures using the information acquired from the Domain B server via the information-transfer-program. The information-use-function "funcname" is implemented in the information-use-browser region, as the information-use-browser region is a browser region of the Domain A, the information-use-browser region can use the information of the information-acquiring-browser-region of the Domain B which is acquired by the information-transfer-program in the information-transfer-browser-region of Domain A, within security restriction of the HTTP client.

Passing data from the information-transfer-program to the information-use-function is done in parallel with the information-transfer-program calling the information-use-function. In the logic of the information-transfer-program, calling funcname (arg1, arg2, ... ) is to pass arguments arg1, arg2, ... to the information-use-function.

Effect of Embodiment 2

Both EMBODIMENT 1 and EMBODIMENT 2 enable the HTTP client to use different domains running the scripting language programs in conformity with security restriction of the HTTP client (browser). The information of a different Domain can be passed to the browser region along to tracing a parent or a parent of a parent from the information-transfer-browser-region moreover it can do so to the browser region with no direct parent-child relationship.

[Variation]

In FIG. 4, the selected browser region having the information-use-browser region as child is in the Domain C, which is different from the Domain A of the information-transfer-browser-region. However, the Domain of the information-transfer-browser-region and the Domain of the information-use-browser region are the same so that the information can be passed with security restriction of the HTTP browser. That is, the Domain of the selected browser region can be arbitrary.

Even in the cases that the browser regions in FIG. 5 are more stacked as than that in FIG. 4, and that more browser region is interposed between the information-acquiring-browser-region (Domain B) and the information-transfer-browser-region (Domain A), the information-transfer-program can discover the information-use-browser region by the method of embodiment 2.

The invention suggests more embodiments as follows:

In the case of passing the information from the information-acquiring-browser-region to the information-transfer-browser-region as arguments of the GET method as EMBODIMENT 1, it is feasible to generate plural information-transfer-browser-regions, to each of which the information fragments can be passed; although the information is received by the information-use-function implemented in the information-use-browser region from the information-transfer-program, which is possible by replacing the information-use-function to a predetermined variable prepared in the information-use-browser region. In the embodiment, as for acquiring the child window object under the parent-child relationship, the child window object is a parent frame generated in the parent window object. However, even in the case that a child window object is pulled up as a new window, the pointer to the child window is generated by the logic of Javascript (registered trademark) of the parent window, if the parent window displays the window object of the the same Domain of the information-transfer-browser-region, the information-transfer-browser-region can acquire the pointer information to reach the child window. In addition, each window object can be in either non-display mode or display mode. As for searching a tree structure, various methods may be applicable.

[Network Information Processing System]

The network information processing system exploiting the described "method for acquiring information of a different Domain" will be described.

The network information processing system described in EMBODIMENT relates to technology of storing the information given by a user of the current Domain displayed by the HTTP client to a different Domain server under the environment of client/server HTTP (Hyper Text Transfer Protocol) communication.

A user input information to the Domain A web page which the HTTP client is displaying, then user wishes the information to be transferred and be stored in the different Domain B server.

Moreover, while HTTP client is displaying a Domain A web page, a user wishes to enable the Domain A web page to acquire the information stored in a different Domain B server.

Domain "A" and "B" are only designating to the different Domains, and the characters "A" and "B" do not have special meanings.

Hereinafter, an embodiment of the network information processing system will be described with reference to the drawings.

FIG. 6 is the block diagram of a network information processing system which consists of: a computer network (Internet) 400 linked to a client computer (client) 100; a storage server computer (storage server) 200; and an application server computer (application server) 300.

Each of the computers 100-300 provides a information input unit such as a keyboard and a mouse, a information display unit such as a display device, a information storage unit such as a memory and a HDD (Hard Disk Drive), a information communicating unit such as NIC (Network Interface Card), and a information processing unit such as a CPU (Central Processing Unit).

In each of the computer 100-300, the information input unit, the information display unit and the information processing unit work their own function and the information communicating unit accesses the storage unit. The information communicating device transmits information among individual computers. The information processing unit runs various programs with various functionalities.

FIG. 7 is the configuration diagram of programs running on the client 100: an OS (Operating System) 101 such as Windows (registered trademark) runs on the client 100; a HTTP client 102 and an extended program 103 run on the OS 101; The extended program 103 has the function of monitoring the HTTP client 102; The HTTP client 102 provides a standard script execution environment 104 such as JavaScript (registered trademark) and runs a script 105 such as JavaScript (registered trademark) program in the script execution environment 104.

In the embodiment, the OS 101 is assumed to be Windows (registered trademark); the HTTP client 102 is Internet Explorer (registered trademark); the script 105 is JavaScript (registered trademark).

In the embodiment, the script 105 stores user authentication information p, which is used for authentication to the storage server 200, and which is acquired in advance from the application server 300 or other unillustrated servers. As for acquiring the user authentication information p, the described "method for acquiring other Domain information" is applied.

The storage server 200 performs a HTTP server with the following functions: authenticating a user of the client 100; storing information transmitted from the client 100 in the storage unit; reading information requested by the client 100 from the storage unit and transmitting it to the client 100. In the embodiment, the Domain B is assumed to be set in the HTTP server run on the storage server 200.

The application server 300 runs the HTTP server with transmitting a webpage containing a script execution instruction to the client 100 via the HTTP server. In the embodiment, the Domain A which is a different domain of the storage server 200 is assumed to be set in the HTTP server run by the application server 300.

FIG. 8 is the configuration diagram of the screen which the client 100 displays on the display unit. The client 100 displays on the display unit several OS management regions such as DESKTOP and FOLDER, and on the OS region content symbols such as icons of a file and thumbnails. The client 100 displays a window of the HTTP client 102 showing the webpage acquired by the HTTP client 102 from the application server 300. The client forms a content supply region and a content display region based on the program description of the webpage.

In the embodiment, when the symbol of the content managed by the OS management region is dragged and dropped into the content supply region, a content instance is transmitted to and stored in storage server 200 by the extended program 103. The content instance stored in the storage server 200 is acquired by the HTTP client 102 to display the content instance or the content symbol on the content display region. (In a case of the content being an audio reproduction content, the content display region is not always needed). Although detailed actions for the HTTP client 102 to acquire the content instance stored in the storage server 200 are described later, the user of the client 100 can treat the webpage of the Domain A without being conscious that the content is actually stored in the Domain B.

ACTION of the embodiment is described based on FIG. 9.

The HTTP client 102 requests the webpage containing the script execution instruction from the Domain A application server 300. The HTTP client 102 establishes a connection with the Domain application server 300 of the Domain A to request the webpage. The application server 300 provides the requested webpage to the HTTP client 102 (S1).

The HTTP client 102 displays, in accordance with running the source of the received webpage, the Domain A webpage on the display unit of the client 100 where the content supply region and the content display region are formed as shown in FIG. 8. The HTTP client 102 runs the first script of the script 105 in accordance with running the source of the webpage. In the content supply region the predetermined upload path identifier for uploading a file to the storage server 200 (Domain B) is embedded in the STYLE attribute of the content supply region object. The identifier can be a URL (Uniform Resource Locator) for uploading.

The extended program 103 monitors the event of drag and drop on the content symbol from the OS management region into the content supply region formed in the webpage.

The user of the client 100 operates the input unit to drag the content symbol displayed in the OS management region of the display unit and drop it into the content supply region in the webpage.

The extended program 103 detects the place where the content symbol is dragged by the predetermined style attribute of the content supply region. If the place where the content symbol is dragged is in the content supply region, the extended program 103 acquires from the HTTP client 102 the following: the user authentication information p for the Domain B acquired in advance by the described "method for acquiring other Domain information"; the upload path identification; the storage place of the content instance (the storage place in the OS management region) corresponding to the dropped content symbol. The extended program 103 transmits the content instance to the acquired upload path, that is, the storage server 200 of the Domain. The extended program 103 issues a POST method with the storage place of the content instance (S3). The user authentication information p for the Domain B is attached to the parameter of the POST method.

The storage server 200 having received the POST investigates validity of the POST based on the user authentication information p attached to the POST. In a case of valid access, the storage server 200 receives the content instance as the target of the POST from the client 100, and stores it in a predetermined storage place (storage region). The storage server 200 notifies the extended program 103 of the completion of storing it as response to the POST.

The script execution environment 104 is on standby for calling the callback function (the second script of the script 105) to acquire the stored content instance from the storage server 200. The extended program 103, when receiving the notification of storing completion from the storage server 200, instructs the HTTP client 102 to invoke the callback function. The HTTP client 102 calls the callback function. Here, it may be sufficient the first script and the second script of the script 105 can be independent each other.

On activating the callback function, the HTTP client 102 requests a file list to the storage server 200 according to the description of the callback function. The file list is a list of files stored in the storage unit of the storage server 200, that is, a list of the content instance stored in the storage unit of the storage server 200 by drag and drop once or many times. The file list includes the file names of the content instances, and information of a URL (Uniform Resource Locator) for acquiring the file. Since the HTTP client 102 displaying the Domain A webpage requests the file list from the Domain B storage server 200, the described "method for acquiring other Domain information" is applied.

The storage server 200, on receiving the request for the file list from the HTTP client 102, reads the requested file list from the storage unit, sends it to the HTTP client 102 by the described "method for acquiring other Domain information."

The HTTP client 102 receives the file list and passes to the callback function. The callback function having acquired the file list reads the association between the file name and a file path described in the file list for every file, and rewrites the values of inner HTML with respect to a HTML of the content display region to generate such a HTML for acquiring images for every file as below. The image content is assumed; however, other kinds of contents can be so long as it is suitable for a matter of the HTML.

[Number 1]

[the acquired file]+'<br>'+'<img src="'[the file path of the acquired file]+'"><br>'

The HTTP client 102 performs the HTML processing for acquiring images generated in the content display region. The HTTP client 102 requests the content files of the file path listed in the file list to the storage server 200. The storage server 200 reads the requested content file based on a designation of the file path attached to the request from the storage unit, and sends it to the HTTP client 102. The HTTP client 102 reproduces the content file received from the storage server 200 in the content display region.

According to the embodiment described above, while the HTTP client 102 displays the Domain A webpage, the information provided to the Domain A webpage can be stored in the Domain B storage server 200. While the HTTP client 102 displays the Domain A webpage, the Domain A webpage can acquire the information stored in the Domain B server and use it dynamically.

In the above embodiment, the HTTP client 102 acquires the authentication information p from the storage server 200. It is also applicable that the extended program 103 can acquire the authentication information p from the storage server 200. The extended program acquires the information needed for authentication such as a user ID and a password by making the user input them. Plural content symbols displayed on the OS management region can be dragged and dropped so as to upload continuously plural contents to the storage server 200.

In the above embodiment the image file of the content is targeted to be acquired as the information relating to the content. It is also applicable that the file list acquired as the information relating to the content includes the name, type and sizes in every file, and contents of the file list can be displayed on the content display region.

DESCRIPTION OF REFERENCE NUMERALS AND SIGNS

A to F Flow of Operation

Figure 1:
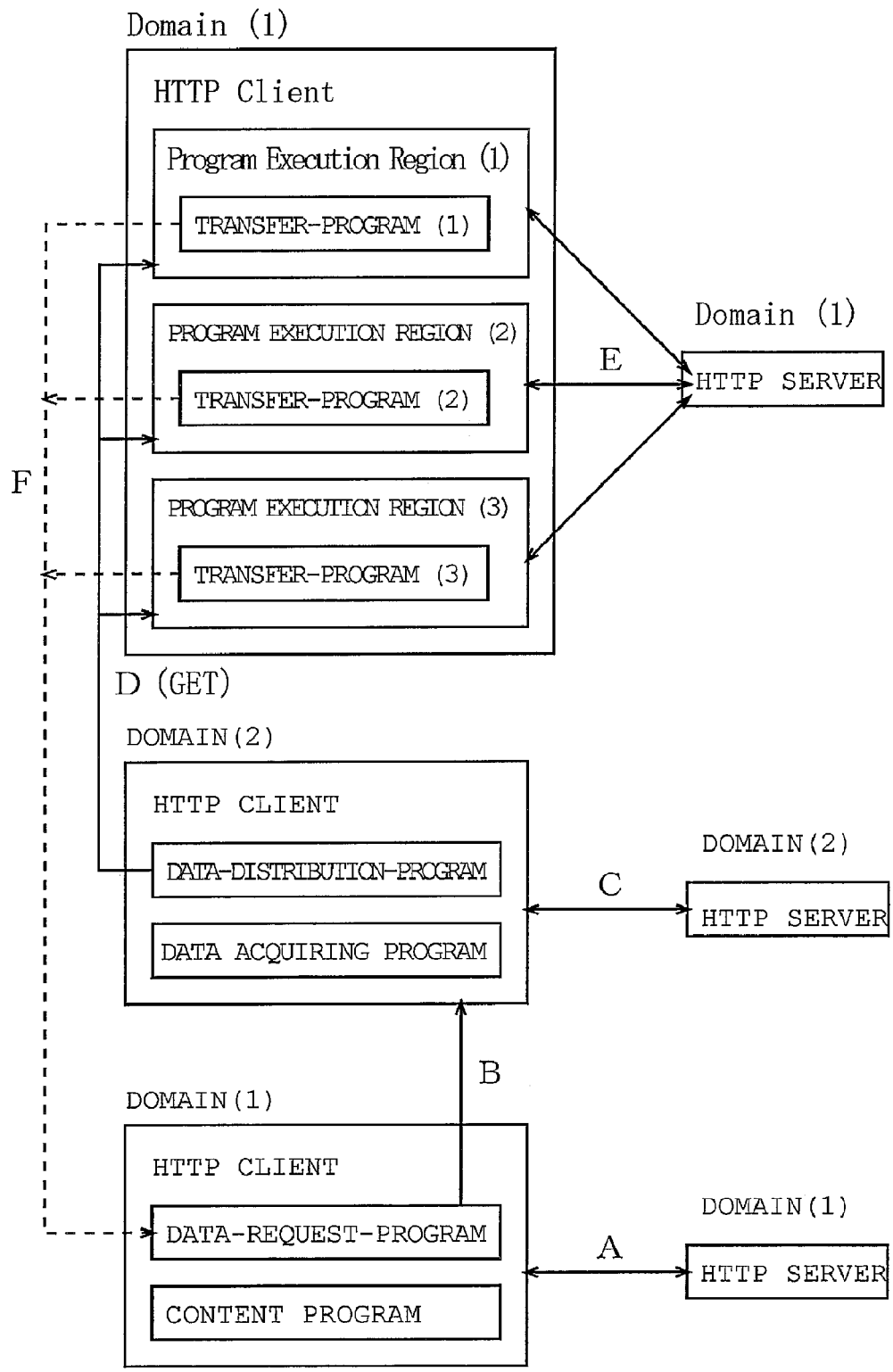
FIG. 1 is a block diagram showing configurations and operations of Embodiment 1.
Figure 2:
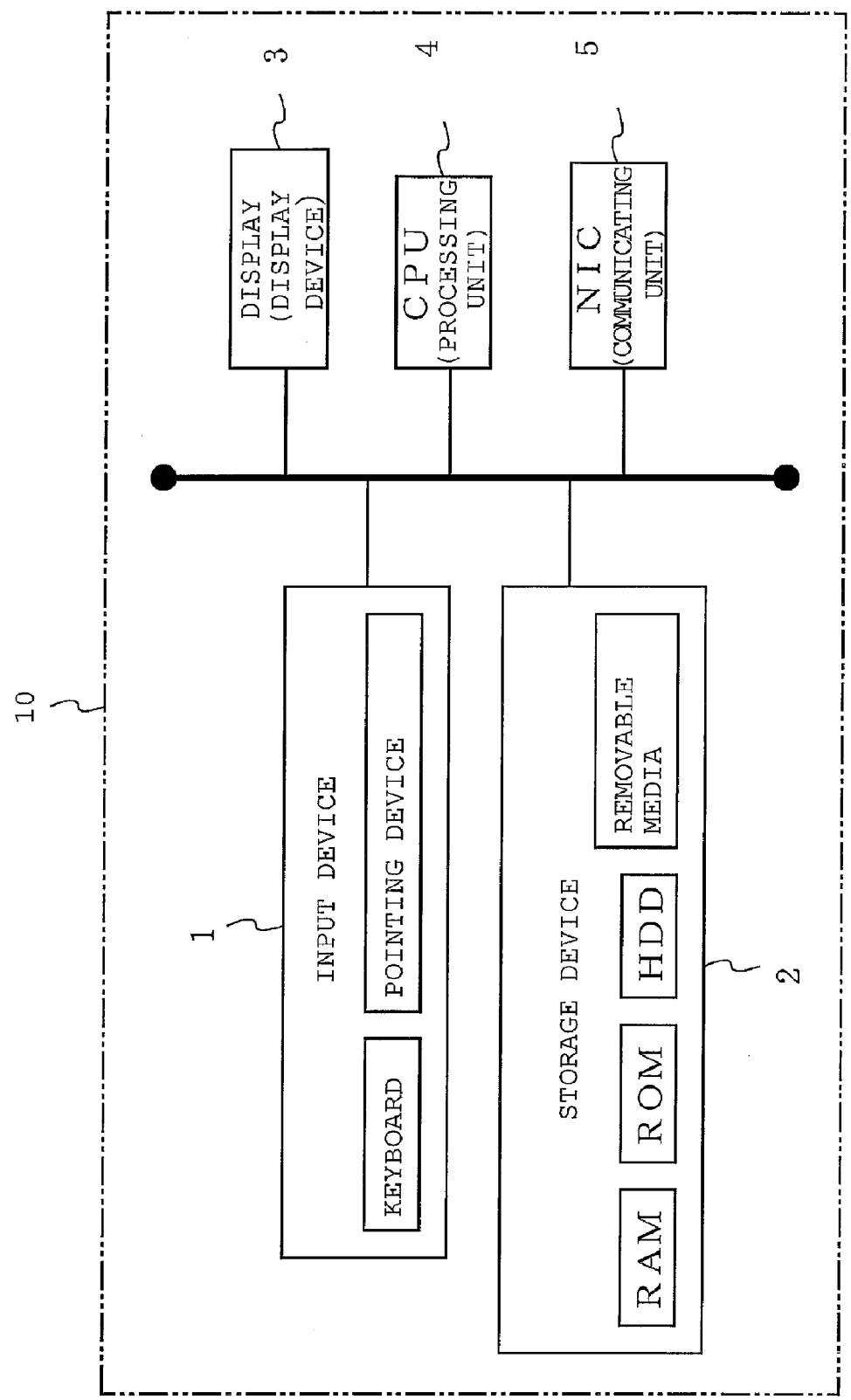
FIG. 2 is a block diagram of a hardware configuration of EMBODIMENT 2.
Figure 3:
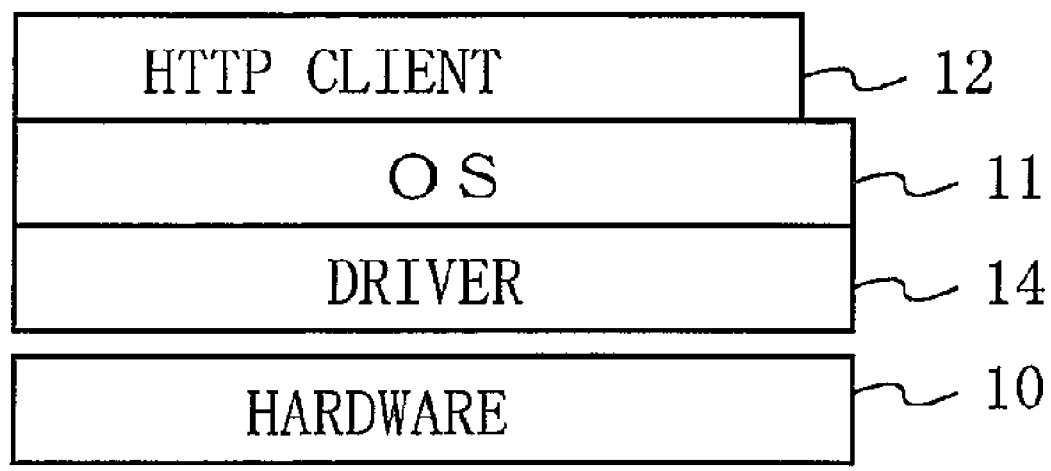
FIG. 3 is a block diagram of a software configuration of EMBODIMENT 2.
Figure 4:
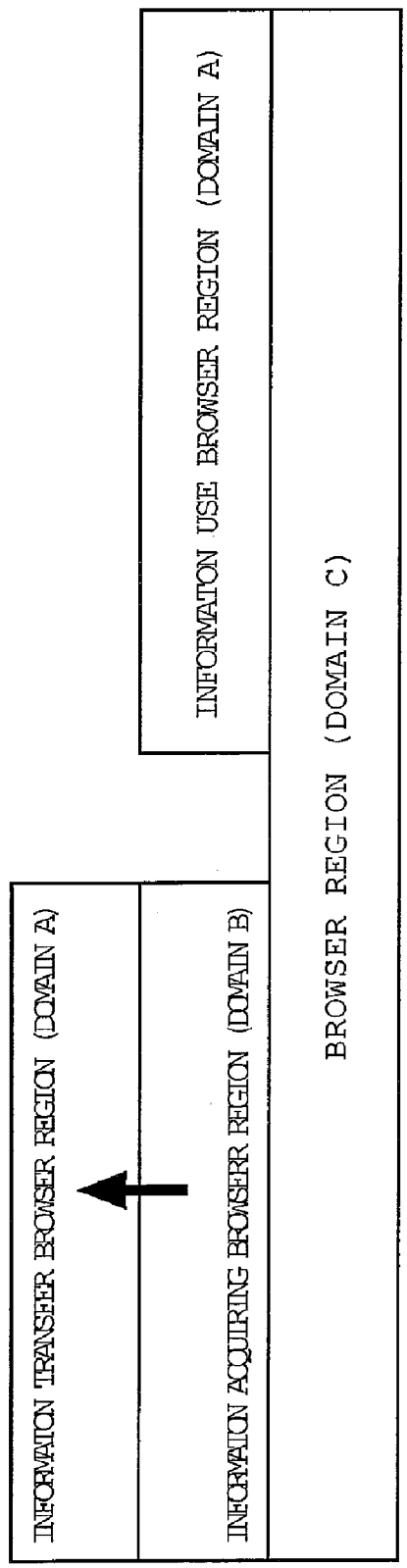
FIG. 4 is an explanatory diagram for explaining ACTION of EMBODIMENT 2.
Figure 5:
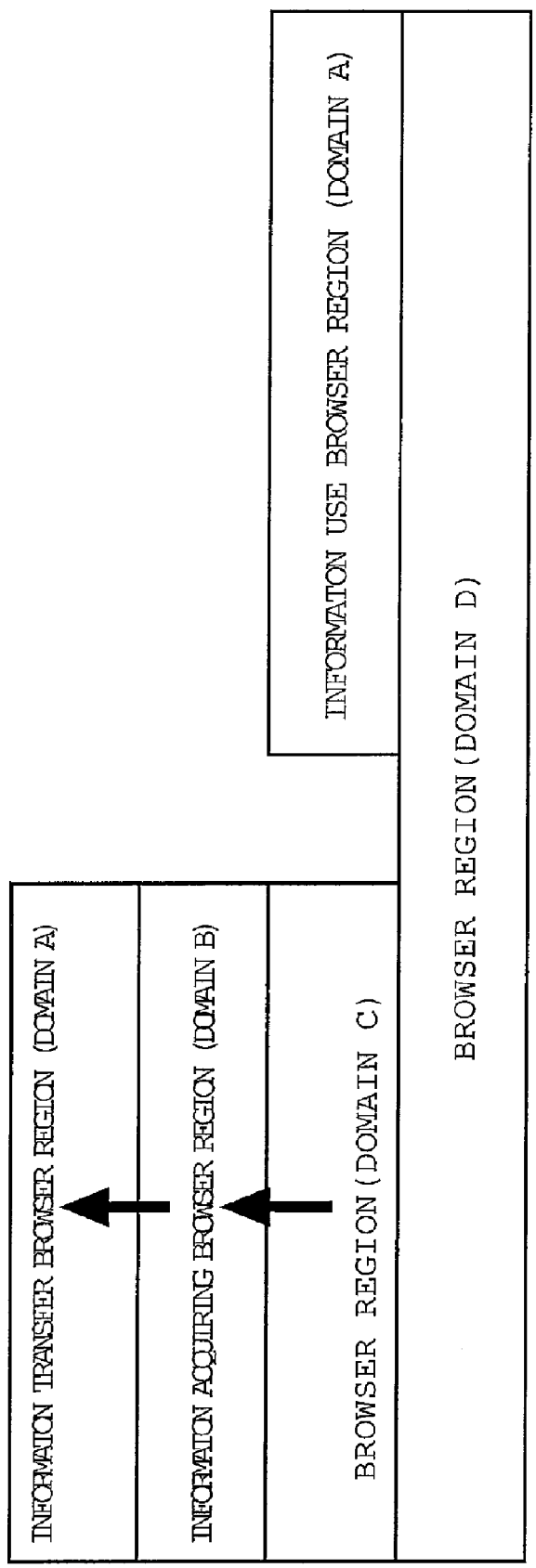
FIG. 5 is an explanatory diagram for explaining ACTION of EMBODIMENT 2.
Figure 6:
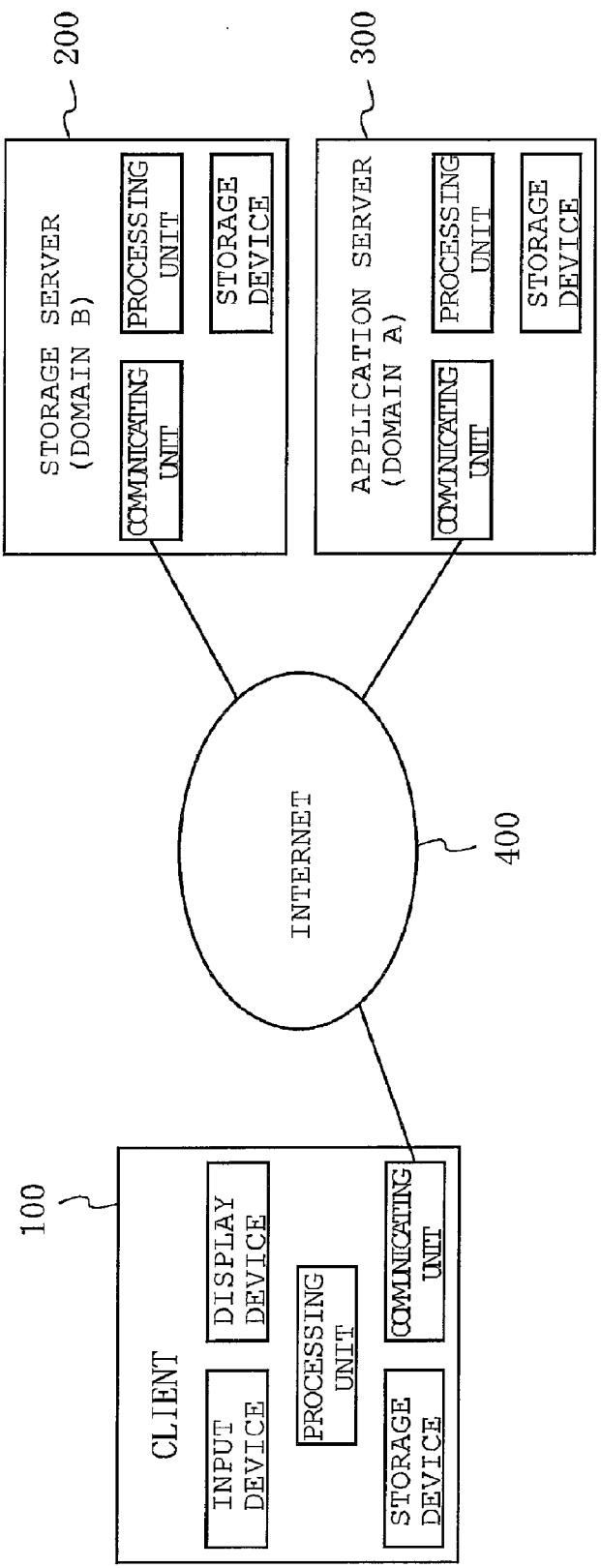
FIG. 6 is a block diagram showing a structure of EMBODIMENT of a network information processing system.
Figure 7:
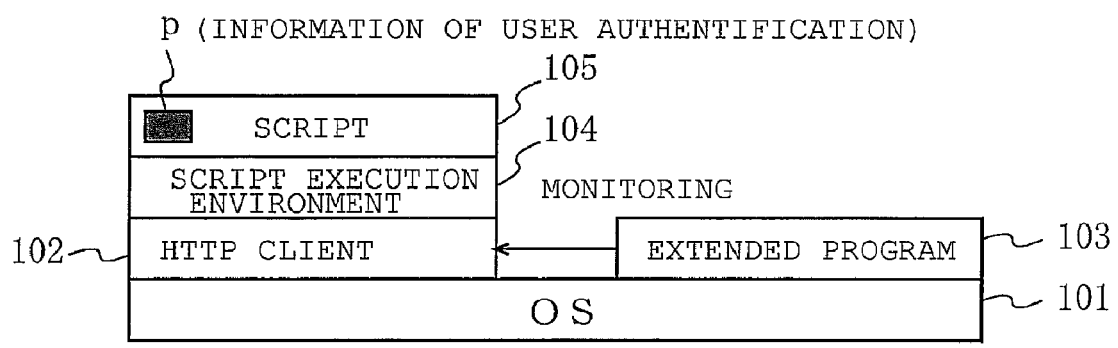
FIG. 7 is a configuration diagram of software running by a client computer.
Figure 8:
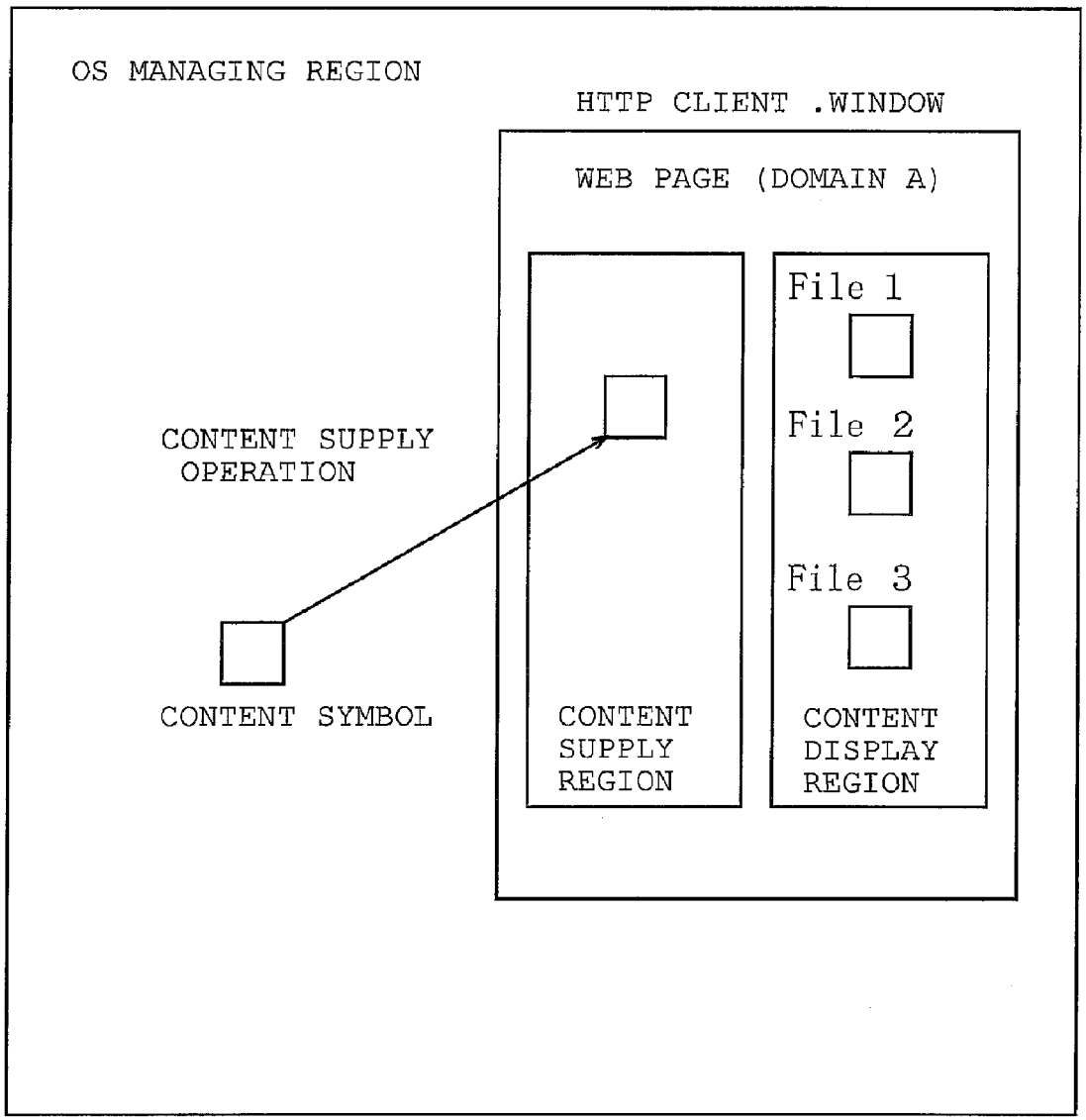
FIG. 8 is a configuration diagram of a screen the client computer displays on the display unit.
Figure 9:
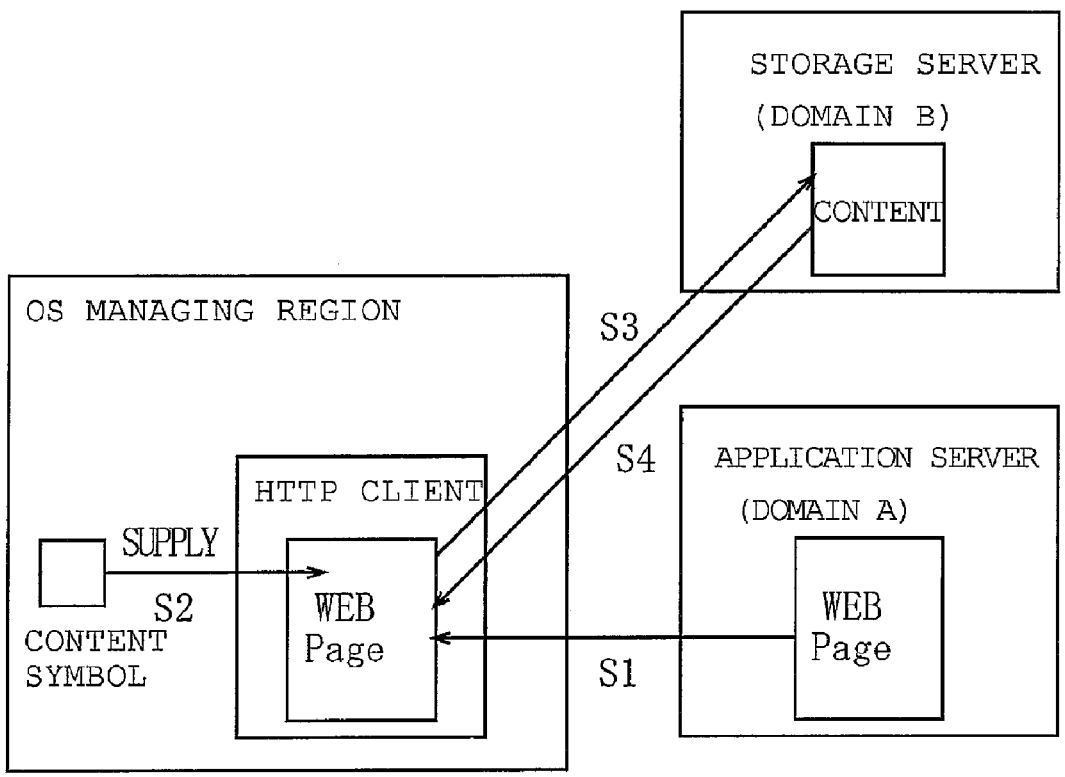
FIG. 9 is ACTION diagram of the system shown in FIG. 6.

What is claimed is:

1. A method for acquiring long data by a GET method, the method comprising: (a) reading long data which cannot be passed by the GET method from a storage unit; (b) dividing the long data into a plurality of segments which can be passed by the GET method; (c) storing the plurality of segments in the storage unit; (d) generating executable program regions, wherein the number of executable program regions is the same as the number of the plurality of segments; (e) using the GET method, distributing the plurality of segments to the generated executable program regions; (f) assigning a GET statement to each of the executable program regions, each GET statement being appended with: (i) attached information associated with each segment, wherein the attached information includes: (a) a number of divided segments; and (b) a sequential segment number, wherein the number of divided segments is only appended to one of the plurality of GET statements, and a respective sequential segment number is appended to each of the plurality of GET statements; and (ii) an ID of a data-request-program that implements a callback function; (g) causing a server to: (i) receive each of the GET statements assigned to each of the executable program regions; and (ii) provide transfer programs to each of the executable program regions; (h) running the transfer programs in respective executable program regions; (i) searching regions for concatenation; (j) passing the segments to the searched regions for concatenation; (k) running concatenation in the executable program regions which have received the plurality of segments to reproduce the long data; and (l) storing the long data in a storage means.

2. A method for acquiring long data by a GET method, the method comprising: (a) reading long data which cannot be passed by the GET method from a storage unit; (b) dividing the long data into a plurality of segments which can be passed by the GET method; (c) storing the plurality of segments in the storage unit, wherein first data of at least one of the plurality of segments overlaps second data of another one of the plurality of segments; (d) generating executable program regions, wherein the number of executable program regions is the same as the number of the plurality of segments; (e) distributing the plurality of segments to the generated executable program regions by the GET method; (f) assigning a GET statement to each of the executable program regions, each GET statement being appended with: (i) attached information associated with each segment, wherein the attached information includes: (a) a number of divided segments; and (b) a sequential segment number, wherein the number of divided segments is only appended to one of the plurality of GET statements, and a respective sequential segment number is appended to each of the plurality of GET statements; and (ii) an ID of a data-request-program that implements a callback function; (g) causing a server to: (i) receive each of the GET statements assigned to each of the executable program regions; and (ii) provide transfer programs to each of the executable program regions; (h) running the transfer programs in respective executable program regions; (i) searching regions for concatenation; (j) passing the segments to the searched regions for concatenation; (k) running concatenation in the executable program regions which have received the plurality of segments to reproduce the long data; and (l) storing the long data in a storage means.

3. The method of claim 1, wherein each of the executable program regions is a frame generated by an IFRAME tag.

4. The method of claim 1, wherein running the transfer programs includes each of the transfer programs associating the ID of the data-request-program, a divided segment number, a sequential segment number, and a segment.

5. The method of claim 1, wherein each of the transfer programs passes the segments to the data-request-program in parallel with each of the transfer programs calling the data-request-program.

6. The method of claim 1, wherein the callback function implemented by the data-request-program is implemented in a parent of a parent of a respective transfer program.

7. The method of claim 1, wherein the data-request-program runs in a first domain and invokes a client to acquire a data-acquiring-program and a data-distribution-program from a second domain.

* * * * *